(12) United States Patent
Bringedal et al.

(10) Patent No.: US 6,350,375 B1
(45) Date of Patent: Feb. 26, 2002

(54) ARRANGEMENT IN A SEPARATOR

(75) Inventors: Bjorn Oyvind Bringedal; Knut Haugen, both of Oslo (NO)

(73) Assignee: ABB Research Ltd., Billingstad (NO)

( * ) Notice: Subject to any disclaimer, the term of this patent is extended or adjusted under 35 U.S.C. 154(b) by 0 days.

(21) Appl. No.: 09/555,552

(22) PCT Filed: Dec. 2, 1998

(86) PCT No.: PCT/NO98/00355

§ 371 Date: Aug. 29, 2000

§ 102(e) Date: Aug. 29, 2000

(87) PCT Pub. No.: WO99/31347

PCT Pub. Date: Jun. 24, 1999

(30) Foreign Application Priority Data

Dec. 3, 1997 (NO) .......................................... 19975590

(51) Int. Cl.[7] .......................... E21B 21/06; B01D 17/00
(52) U.S. Cl. ...................... 210/170; 210/535; 210/537; 210/540; 166/75.12
(58) Field of Search ............................. 210/170, 532.1, 210/534, 535, 537, 540; 166/75.12

(56) References Cited

U.S. PATENT DOCUMENTS

| 242,236 | A | * | 5/1881 | Torelli ......................... 210/534 |
| 559,594 | A | * | 5/1896 | McFarlane ................... 210/534 |
| 853,704 | A | * | 5/1907 | Lewicki ....................... 210/534 |
| 2,457,828 | A | * | 1/1949 | Lloyd .......................... 210/534 |
| 2,907,461 | A | * | 10/1959 | Lee .............................. 210/534 |
| 3,979,290 | A | * | 9/1976 | Löffler ......................... 210/534 |
| 4,466,154 | A | * | 8/1984 | Urbani ......................... 210/537 |
| 4,948,393 | A | | 8/1990 | Hodson et al. |
| 5,244,573 | A | * | 9/1993 | Horisawa .................... 210/535 |
| 5,405,530 | A | * | 4/1995 | Weiler et al. ................ 210/535 |

FOREIGN PATENT DOCUMENTS

| EP | 0629424 | 12/1994 |
| GB | 2030884 | 4/1980 |
| NO | 176451 | 4/1995 |
| NO | 950717 | 5/1996 |
| NO | 180732 | 6/1997 |
| WO | 97/18025 | 5/1997 |

* cited by examiner

*Primary Examiner*—Christopher Upton
(74) *Attorney, Agent, or Firm*—Volpe and Koenig, P.C

(57) ABSTRACT

The present invention relates to an arrangement in a separator, especially a gravity separator (1), to which separator is supplied with well fluid containing sand, and to avoid sand settling on walls of pipes or separators; it is according to the invention, suggested that the separator (1) comprises a conical part (5), which passes into a sloping or mainly vertical arranged bottom pipe (7), for, so to speak, continuous bottom outlet of sand (6), which is suspended in a fluid, mainly sand carrying water.

4 Claims, 1 Drawing Sheet

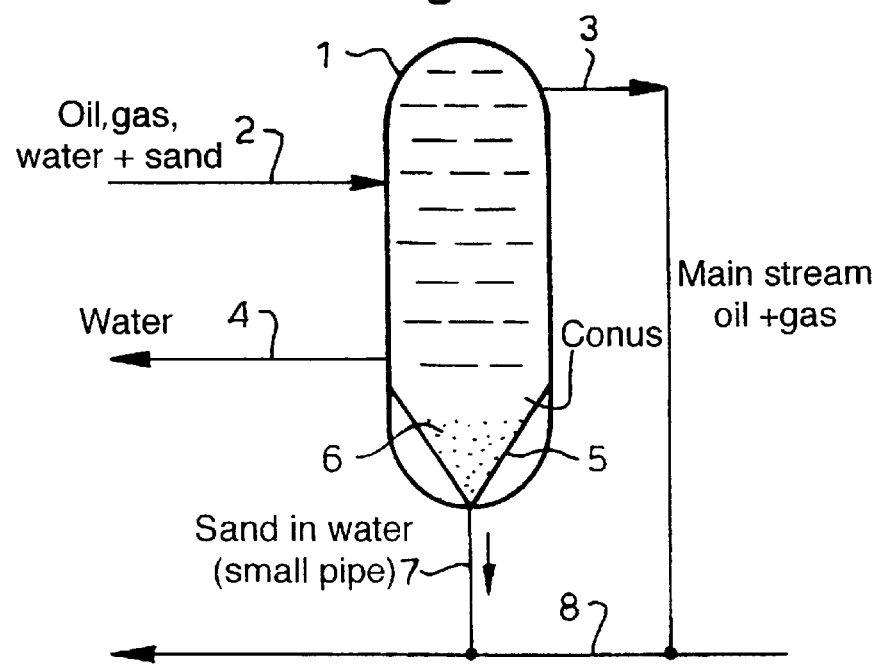
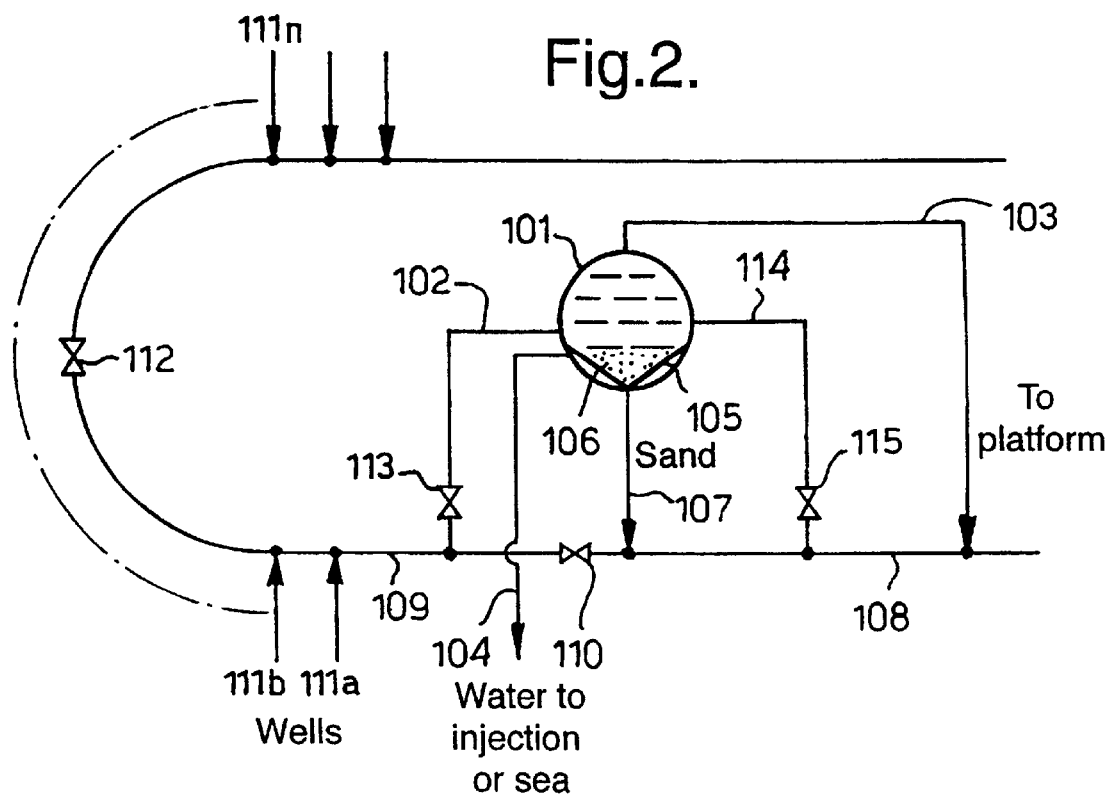

ARRANGEMENT IN A SEPARATOR

FIELD OF THE INVENTION

The current invention relates to an arrangement in a separator, in particular a gravity separator, to which separator is supplied well fluid containing sand.

BACKGROUND OF INVENTION

The invention primarily aims at giving instructions on a technique where accumulation of sand in a gravity separator is avoided. The sand entering the separator with the main stream from, e.g. a production well, tend to settle on pipe or separator walls. Such sand sediments can be difficult to remove due to adhesive and cohesive forces.

PRIOR ART

From the patent literature the problem named above concerning accumulation of sand in a gravity separator, seems not to be given particular attention. There exist a number of methods that deals with other types of separators, e.g. cyclones trough which are fed a continuous stream of fluid containing solid particles such that accumulation of sand is avoided, but not in connection with gravity separators.

From NO patent 176 451 there is known a device for processing of well fluids from oil or gas wells on the sea-floor utilising a separate accumulation tank for solid components or particles, placed below a separator tank.

From the bottom of the separator tank to the top of the accumulation tank there is placed a mainly vertical connection pipe with a cut off valve, and when this cut off valve is closed, collected components or particles can be removed from the accumulation tank. In other words this relates to a successive collection of solid components or particles, and a successive emptying of the accumulation tank, respectively.

SUMMARY OF THE INVENTION

An object of the present invention is to provide an arrangement in a gravity separator, where sand can be removed from the separator with simple means.

Another object of the invention relates to continuous removal of sand from the gravity separator and continuous removal of the precipitated sand from the area of the separator.

Still another object of the present invention relates to transferring the problem of sand sedimentation in a gravity separator to other sections of the installation comprising the gravity separator, where it is easier to handle this problem.

These objects are achieved in an arrangement as initially mentioned, which according to the invention is characterised in that the separator comprises a lower conical part that leads into an oblique or mainly vertically arranged bottom pipe for practically continuous release from the bottom of sand entrained in water, mainly sand-carrying water.

Additional advantages and features of the present invention will appear from the following disclosure in connection with the appended drawings, as well as the appended claims.

BRIEF DESCRIPTION OF THE DRAWINGS

FIG. 1 is a schematic sketch of a gravity separator, designed according to a general embodiment of the invention.

FIG. 2 is a schematic sketch of an embodiment of a gravity separator included in an installation of several production wells.

DISCLOSURE OF EMBODIMENTS

In FIG. 1 there is shown a separator, in particular a gravity separator 1, which via a supply line 2 is supplied with well fluid comprising oil, gas, water and sand.

From the upper part of the separator there is drawn off a mainstream comprising oil and gas via a first outlet line 3, while there on a lower level is drawn off separated water from a second outlet line 4.

Below the second outlet line for water the gravity separator 1 designed with a lower conical part 5 acting as a guide for sand 6 entrained in a surplus part of the separated water. The conical part 5 leads to a oblique or mainly vertical arranged bottom pipe 7 for practically continuous bottom outlet of sand entrained in or carried of the mentioned surplus part of the separated water.

The named bottom pipe 7 is preferably connected to a transport pipe 8, which on its other side can suitable be coupled to said first discharge pipe 3 for the main stream of oil and gas, respectively constitutes a extension of said pipe.

Consequently, the sand entrained (suspended) in water can be carried back to the well fluid, from which water has been separated, and which is being transported through pipes, where the velocity of flow is sufficient to hold the said entrained, and adapted for pig cleaning in an adequate way.

The coned part 5 at the bottom of the gravity separator 1 is arranged lower than the main outlet 4 for separated water, and the dimension on the bottom pipe 7 can be less than said main outlet 4 for the separated water.

On FIG. 2 there is schematically illustrated how a gravity separator according to the invention can adapt a system, where several wells are included. Here is the gravity separator signified with 101, the first supply pipe for oil, gas, water and sand is signified with 102, the first outlet line for a main stream of oil and gas is signified with 103, and the other outlet line for separated water is signified with 104. The gravity separator 101 is here also achieved with a coned party 105, which lead particles of sand 106 through a smaller bottom pipe 107 to a transport line 108, which in the shown embodiment is coupled to another supply line 109 via a suitable valve 110, which additional supply line 109 communicates with a multitude of wells 111A, 111B . . . 111n with suitable valves 112 arranged therebetween.

On FIG. 2 it is in the supply line 102 illustrated a valve 103, and further it is by the embodiment on FIG. 2 shown a third outlet line 114 from the gravity separator 101, which outlet line 114 via a valve 115 can communicate with said transport line 108. With the aid of the first supply line 102 with a valve 112 and the third outlet line 102 with a valve 112 and the third outlet line 114 with valve 115 it can be achieved a flexible in and out feeding at the separator, for example dependent by the different components relative contents in the well fluid.

In other words, there is according to the invention given an instruction on a technique, which comprises the following steps:

1. The sand that enters with the main stream, is kept in suspension through and out of the separator to avoid sand settling on the walls of pipes or separators. This is to be done because sediments of sand can be hard to get off due to adhesion and cohesion forces.
2. A separator is being used with a conical shaped bottom, so that the sand will not settle on the wall, but falls all the way down to the bottom, where the cone passes into a pipe and out off the separator.
3. Through this pipe fluid streams continuously with sand.

4. The pipe, which goes out from the cone in the bottom of the separator, slopes downwards to a pipe, where sand is not a problem, for example because pig cleaning can be done there or because the velocity of flow is sufficient to keep the sand suspended.

What is claimed is:

1. An arrangement of a fluid/fluid gravity separator for separating water from well fluid containing sand, comprising:

a supply line which provides well fluid from at least two wells connected to a separator;

a main outlet on the separator for water separated from the well fluid;

the separator having a conical bottom part connected to a sloping or generally vertical bottom pipe, the conical part adapted to collect and convey sand suspended in the well fluid to the bottom pipe for continuous discharge, the bottom pipe being connected to a transport pipe for well fluid which stems from the same separator, the transport pipe being supplied with the well fluid from which water has been separated by the separator.

2. The arrangement of claim 1, wherein the conical part is positioned lower than the main outlet, and a diameter of the bottom pipe is smaller than a diameter of the main outlet for separated water.

3. The arrangement of claim 1, wherein the transport pipe is positioned to allow cleaning by insertion of a cleaning pig.

4. An arrangement of a fluid/fluid gravity separator for separating water from well fluid containing sand, comprising:

a supply line which provides well fluid from at least two wells connected to a separator;

a main outlet on the separator for water separated from the well fluid;

the separator having a conical bottom part connected to a sloping or generally vertical bottom pipe, the conical part adapted to collect and convey sand suspended in the well fluid to the bottom pipe for continuous discharge, the bottom pipe connected to a transport pipe for well fluid from an upper part of the separator, the transport pipe being supplied with the well fluid from which water has been separated.

* * * * *